United States Patent Office  3,577,359
Patented May 4, 1971

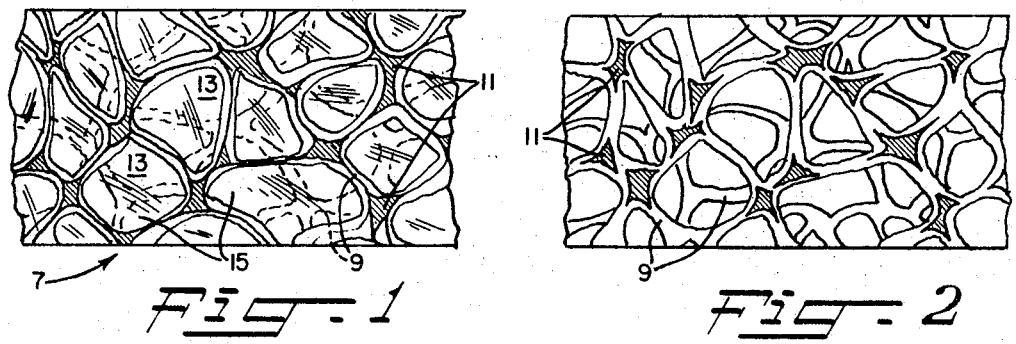
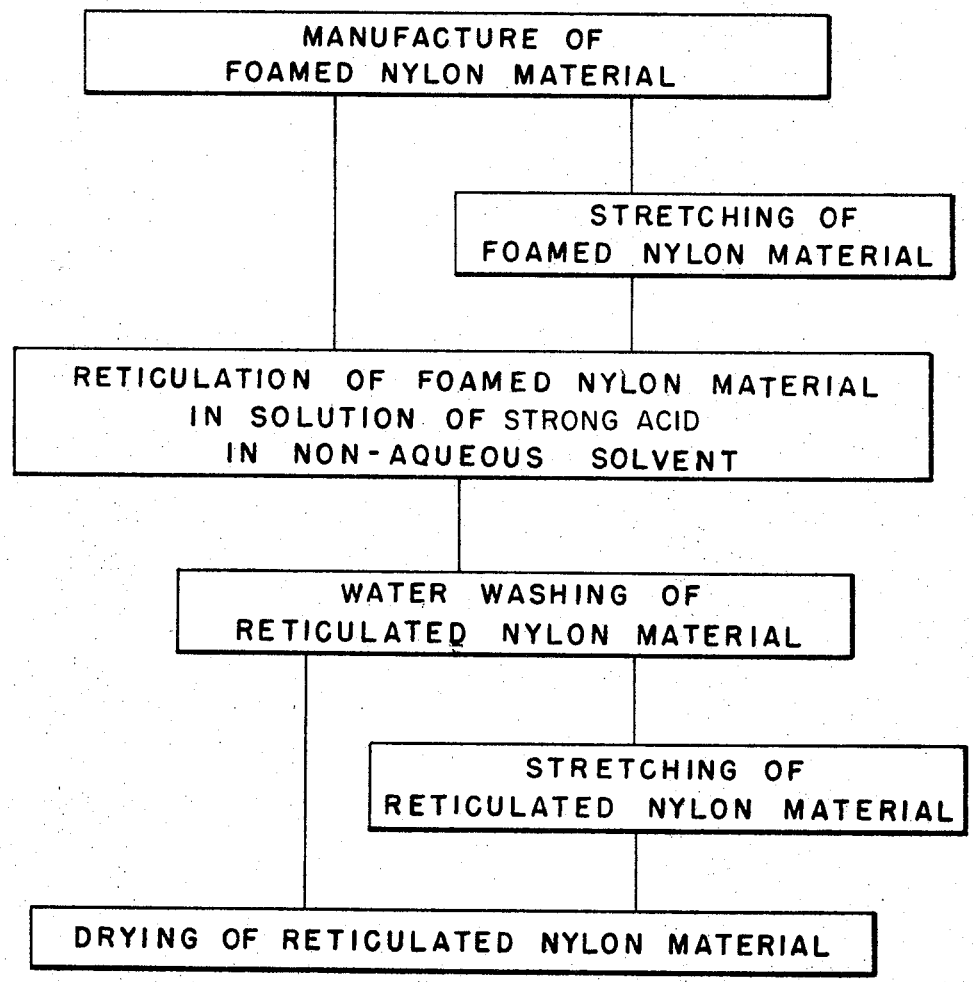

3,577,359
METHOD OF RETICULATING NYLON MATERIALS
Frank E. Carevic and Theodore H. Fairbanks, West Chester, Pa., assignors to FMC Corporation, Philadelphia, Pa.
Filed Feb. 5, 1968, Ser. No. 703,068
Int. Cl. C08g *53/08, 53/20*
U.S. Cl. 260—2.5                                    7 Claims

ABSTRACT OF THE DISCLOSURE

A foamed nylon material, formed of contacting cells which provide a skeletal structure of interconnected strands with membranes partitioning contiguous cells and joined to the skeletal structure, is exposed to a solution of a strong acid and a non-aqueous solvent to remove the cell membranes, leaving the skeletal structure of nylon material which is suitable, for example, as a filter.

---

The present invention is directed to a method of making reticulated structures from foamed nylon materials.

Reticulated materials, and particularly reticulated polyurethane foams, are disclosed in the prior art. The United States patent to Volz 3,171,820 discloses a number of methods for producing reticulated foams. One method disclosed in the Volz patent involves subjecting a foamed opened cell, cellular polyurethane foam to the hydrolytic action of water in the presence of a hydrolysis catalyst which accelerates the hydrolytic action until at least substantially all membranous polyurethane is removed from the foam. Another method described by Volz involves passing a high temperature flame front, generated by an expanding gas mixture, through a membrane-bearing, open-celled polyurethane foam. Still another method disclosed by Volz involves a prolonged exposure of an open-celled polyurethane foam to noncatalyzed aqueous hydrolytic conditions at about room temperature. In a still further method mentioned in the Volz patent, an open-celled polyurethane foam is heated in the presence of steam for a prolonged period.

A United States patent to Green 3,175,025, is also directed to a process for making reticulated polyurethane materials which comprises providing a combustible mixture of an oxidizer material and an oxidizable material within a cellular polyurethane material having heat destructible membranes and thereafter igniting the mixture to thereby produce a reticulated structure.

In another United States patent to Geen 3,175,030 a method is described in which an open-celled polyurethane foam is subjected to a light pulse of sufficient intensity or energy to remove some portion of or all of the cell membranes.

As indicated by the above patents, the prior art is primarily concerned with reticulated polyurethane materials and, while such materials are suitable for various uses including fluid filtering, their applications are greatly limited by the aging and hydrolytic instability of polyurethane and the comparatively low strengths of the reticulated polyurethane structures.

Unitted States patent application of T. H. Fairbanks, Ser. No. 641,769, filed May 29, 1967, and entitled "Reticulated Nylon Materials and Process for Their Manufacture," now United States Patent 3,496,266, describes a procedure for removing windows or cell membranes of a foamed nylon material using an aqueous solution of a phenolic compound. This procedure, while providing highly satisfactory reticulated nylon structures, is perhaps more expensive and is accompanied by odors and vapors which personnel may find unpleasant and/or allergenic. Accordingly, a primary object of this invention is to provide a new or improved and generally more satisfactory method for producing a reticulated structure formed of nylon.

Another object is to provide a method for making a reticulated nylon web in which obnoxious odor and/or vapors are minimized or non-existent.

Still another object is the provision of a method for making a reticulated web of nylon in which the molecules thereof are oriented to impart to the web improved strength and smooth fabric-like properties.

A further object is the provision of a rapid and simple method for converting a generally closed-cell foamed material of nylon into a skeletal or reticulated structure.

Still further objects will appear in the following description of the invention.

These objects are accomplished in accordance with the present invention by a method in which a foamed nylon material having contacting cells which together provide a skeletal structure formed of a network of interconnected strands and membranes or windows joined to the skeletal structure and partitioning contiguous cells, is exposed to a reticulating solution of a strong acid in a non-aqueous solvent for such strong acid until the membranes or windows are partially, and preferably substantially, completely removed. The reticulating or treating solution is highly selective and thus the strands and their junctures maintain the integrity of the network through this treatment.

This network of nylon strands and the somewhat thicker strand-interconnecting junctures which are recovered define a skeletal or reticulated structure which can perhaps be best visualized as consisting of a plurality of polyhedrons having polygonal faces, each of which is common to adjacent polyhedrons and being substantially free of membranes or windows.

Preferably, and particularly in the case of a nylon web, the closed-cell foamed nylon material is stretched at least along one and desirably along both of its axial directions to induce orientation of the molecules thereof. Such stretching provides the finished reticulated material with a smooth, fabric-like appearance and, more important, the molecular orientation imparts greater strength to the skeletal structure than it would otherwise possess. Of still further significance, stretching of the closed-cell foamed nylon material reduces the thickness of the cell membranes and may perhaps cause some of the membranes to rupture, thus permitting the treating solution to more rapidly penetrate into the foam material.

Neither the degree, rate, or manner of stretching of the nylon material is critical for satisfactory practice of the method of the present invention. Of course, if a finished reticulated structure having high strength characteristics is desired, the nylon material is stretched to its maximum degree without inducing tearing. On the other hand, if stretching the nylon material is performed primarily to enlarge the openings or pores thereof, the degree of stretching can be adjusted accordingly. Stretching of the closed-cell nylon material along biaxial directions can be effected in two separate stages with the initial stretch extending either longitudinally or transversely of the material, or the material may be stretched simultaneously along both of its axial directions without substantially affecting the characteristics of the finished reticulated material.

Preferably, the nylon material, once stretched, is held in its extended condition during its treatment with the reticulating solution. In this manner, relaxation of the stretched material during treatment is avoided and more rapid and uniform penetration of the reticulating solution is obtained. In applications where strength is a prime consideration, it is preferred that the reticulated material be further tensioned, as for example from about 1% to 10%, after its treatment with the reticulating solution to remove any residual elongation which may exist in the material and thus assure that the highest degree of orientation is achieved.

The reticulating solutions employed in the method of the present invention may be prepared from a variety of common strong inorganic and organic acids having pk values (negative logarithms of the acid dissociation constants k) less than 3.0 in aqueous solutions, as measured at about 25° C. Such acids, include hydrochloric acid, sulfuric acid, perchloric acid, phosphoric, benzosulfuric, dichloroacetic, chloroacetic, oxalic, etc. Other acids such as citric, fumaric, and succinic, all having pk values greater than 3.0 in aqueous solution, were found to be ineffective in reticulating a nylon foamed material when used in non-aqueous solvents. Similarly, one may select from a large number of common non-aqueous solvents, within which such acids are soluble such as, acetone, glacial acetic acid, isopropyl alcohol, tetrahydrofuran, dioxane, benzene, ethyl alcohol and higher alcohols, etc. The choice of acid and non-aqueous solvent will, in general, depend upon considerations as price, toxicity, corrosiveness, odor, insolubility or difficulties of removal from the article being treated.

The amount of acid employed in the reticulating solution will vary, of course, with the particular acid employed. The concentrations of the different strong acids which may be used can therefore be best defined by equating the reticulating activity produced by solutions containing such different acid and a non-aqueous solvent. Throughout the description and claims the concentrations of strong acids contained in the reticulating solutions are expressed on a weight basis.

Mor particularly, a reticulating solution containing hydrochloric acid in acetone and having a hydrogen chloride concentration of from about 0.2% to about 5.0% and preferably from about 0.4% to about 2.0% is highly satisfactory for use in the method of the present invention. Thus, reticulating solutions of other strong inorganic or organic acids in non-aqueous solvents having a reticulating effect equivalent to a solution containing from about 0.2% to about 5.0%, and preferably from about 0.4% to about 2.0% of hydrogen chloride in acetone are equally satisfactory for use in the method of the present invention. For example, a reticulating solution containing from about 1.0% and 15.0%, and preferably from about 2.0% and 10.0% of sulfuric acid (96%) in isopropyl alcohol will provide a reticulating activity on a foamed nylon material generally equivalent to a solution having hydrogen chloride concentrations within the ranges noted above.

The concentration of the strong inorganic or organic acid employed, within the ranges specified above, will vary with the intended duration of treatment, the reticulating effect desired, etc. In general, the temperature of the reticulating solution has no critical bearing upon its reticulating effect and, as a matter of convenience, is maintained at about room temperature.

Immediately after exposure to the treating solution for the period necessary to effect removal of the cell membranes or windows, the remaining skeletal or reticulated nylon structure is washed in a bath of water which may be heated, if desired. When an after-stretching of the reticulated nylon structure is necessary or desirable, it is preferably achieved during the cleaning of the structure within the water bath. Drying of the washed reticulated structure may be effected in any convenient manner, such as by blowing heated air through the structure.

The resulting reticulated nylon material possesses better stability to aging than polyurethane foams and can be advantageously employed in filtering both liquids and gases. The reticulated nylon materials of the present invention and particularly those which have molecular orientation, are adapted also for a variety of other uses, such as heat insulating fabrics, mats, pads, screens, etc.

The mechanism by which a solution of a strong inorganic or organic acid and a non-aqueous solvent effects reticulation of foamed nylon materials or webs still warrants considerable study. The process disclosed in the above-noted pending application Ser. No. 641,769, now United States Patent 3,496,266 provides for reticulation of foamed nylon webs using an aqueous solution of a phenolic compound. Although phenolic compounds are themselves weakly acidic, aqueous solutions of common acids, such as hydrochloric, sulfuric, acetic, and nitric, are unsatisfactory since the concentration of acid which is necessary for removing membranes or windows of a foamed nylon material also causes a general degradation of skeletal structure of such material.

An explanation of the mechanism involved in the method of the present invention which is predicated upon solvation of the polymer of the foamed nylon material prior to chemical attack is believed untenable. Since reticulation is selective; that is, removal of the cell membranes of the foamed nylon material must precede any deterioration of the skeletal structure, the method must be short-stoppable and thus polymer solvation is just what is least desired.

Investigations have been also made to determine if the chemical mechanism involved in the method of the present invention is perhaps analogous to the hydrolytic reaction employed in the above-mentioned United States Patent 3,171,820 to Volz. Such reaction should proceed with strong basic catalysis and thus foamed nylon material would be expected to be reticulated when treated with aqueous solutions of sodium hydroxide, potassium hydroxide, as well as solutions of sodium methoxide and alcoholic potassium hydroxide, which was formed by dissolving potassium hydroxide in an equal amount of water and then diluting with ethyl alcohol. However, all of these solutions were found to be inactive, under conditions sufficient for complete reticulation by the acidic solutions of this invention.

Next a foamed nylon material was treated with a solution containing methyl alcohol, distilled from a sodium methoxide solution, and 10% of sodium. The solution was also found to show no reticulating effect upon foamed nylon material.

It is also known that a hydrolysis reaction should not proceed in an anhydrous system and thus such solution was prepared by bubbling hydrogen chloride gas into dry methyl alcohol. This anhydrous solution was found to be as active, and as destructive, as the aqueous acid solutions heretofore mentioned.

Of still further significance is that hydrolysis of a polyurethane foam proceeds at a rather slow rate while the solutions employed in the method of the present invention provide almost instantaneous reticulation of a foamed nylon material. Taken together, these findings establish that the mechanism involved in the reticulation of a foamed nylon material by the method of the present invention is not a hydrolysis reaction, nor is it, probably, a covalent bond breaking.

It is quite likely that the solution of an inorganic or organic acid in a non-aqueous solvent provides for hydrogen bond disruption. Such hypothesis does explain why water is not necessary in the reticulation solution, and that reticulation by the method of the present invention is almost instantaneous and selective. In the matter of selectivity, hydrogen interchange is instantaneous and hence is way ahead of the relatively slow penetration of the solution into the nylon polymer. Thus, the reaction is confined, at first, to the exposed surfaces, and the membranes of the foamed nylon material, which are almost entirely composed of exposed surfaces are the first to go and are removed before any apparent removal of the foam skeletal structure.

In the drawing, FIG. 1 is a fragmentary view, on an enlarged scale, of a section of a closed-cell cellular or foamed nylon material prior to being reticulated in accordance with the method of the present invention;

FIG. 2 is a view similar to FIG. 1 illustrating the three-dimensional reticulated nylon material of the present invention; and FIG. 3 is a diagram showing the steps employed in the method of the present invention.

In the production of a cellular nylon material as shown in FIG. 1 of the drawing a solid chemical blowing agent, such as azodicarbonamide, sold under the name of "Kempore" 125 by National Polychemicals Inc., or p,p'-oxi-bis (benzenesulfonyl hydrazide), sold under the name of "Celogen" by Naugatuck Chemical Company, is incorporated into a polyamide or nylon resin of the polyhexamethylene-diamine-adipic acid type, such as nylon 66, or the poly-5-aminocaproic acid type, such as nylon 6. Such solid chemical blowing agents can be conveniently and uniformly applied as a powder or dust onto the surfaces of nylon resin pellets which may have been pretreated, as for example with mineral oil.

This mixture of nylon resin and solid chemical blowing agents is then charged into an extruder, heated to a molten condition while being mixed under pressure, and then extruded through a slot or other orifice into a zone of lower pressure, such as the ambient room atmosphere. The blowing agents decompose when heated and thus generate gases which serve to expand or foam the nylon resin as it issues into the zone of lower pressure. The extruded foamed nylon material or web is then cooled, as by contact with a chilled roller or within a quench bath. The resulting foamed nylon web is of generally closed-cell cellular construction.

As more fully described in United States Patent 3,251,911 solid chemical blowing agents, such as those mentioned above, decompose exothermally when heated and elevate the temperature of the thermoplastic material locally. It is in these heat centers that nucleation of the generated gases occurs and at which expansion or foaming of the molten nylon resin takes place as it issues from the extruder. Nucleation of gases within the molten resin can also be obtained by incorporating into such resin discrete particulate matter which is insoluble in the resin itself.

Of course, by increasing the number of nucleation sites which are present in the molten resin, a greater number of cells are formed when such resin expands. These cells, however, are of smaller size and are more uniformly distributed. Thus, in preparing the foamed nylon web for use in the method of the present invention, it is preferred that metal powders, such as zinc dust, be intermixed with the nylon resin, along with the solid chemical blowing agent, to insure that the resulting foamed nylon web have a uniform distribution of fine or small cells.

As shown in FIG. 1 of the drawing, a foamed nylon web 7, which has been formed as described above, includes strands 9 which are interconnected at junctures 11 to provide a network structure, and thin membranes or windows 13 which extend between the strands 9 and partition adjacent cells 15 from each other.

The nylon web 7 is preferably stretched in a convenient manner, and desirably to equal degrees, in directions extending along both its longitudinal and transverse axes to effect orientation of the molecules. As heretofore mentioned, stretching of the foamed nylon web is not necessary for satisfactory practice of the present invention but is preferred in view of the greatly improved strength properties which such web exhibits after reticulation.

With the foamed nylon web maintained in its extended or stretched condition, it is immersed or otherwise exposed to a reticulating solution of an inorganic or organic acid and a non-aqueous solvent. Such solution may be formed, for example, of hydrochloric acid (pk of about −7) and acetone containing from about 0.2% to about 5.0%, and preferably from about 0.4% to about 2.0% hydrogen chloride or other inorganic or organic acids and non-aqueous solvents having an equivalent reticulating effect. Reticulating solution having a reticulating effect upon a foamed nylon web equivalent to the solution described above may, for example, contain from about 1.0% to about 15.0%, and more preferably from about 2.0% to about 10.0% sulfuric acid in isopropyl alcohol, or from about 0.25% to about 5.0% of dichloroacetic acid in benzene.

As heretofore mentioned, the reticulating solution removes the membranes or windows 13 of the foamed nylon web, leaving behind a structure formed of a network of interconnected strands 9, as shown in FIG. 2. The cell membranes of the foamed nylon web are much thinner than the strands 9 and the still thicker strand junctures 11 and thus are rapidly removed without causing any apparent degradation in the remaining skeletal structure.

Immediately following this treatment, this now reticulated web structure is washed in a bath of water. While within this wash bath, the reticulated nylon web is preferably extended to insure that maximum stretching and molecular orientation has been achieved. The manufacture of the reticulated web is now completed and dried, as by warm air; and collected or cut into sections.

The invention is illustrated by the following specific examples:

EXAMPLE I

A blend consisting of 1,000 grams of nylon-6 resin, sold under the name of "Plaskon" by Allied Chemical Company, 10 grams of azodicarbonamide, sold under the name of "Kempore" 125 by National Polychemical, Inc., and 10 grams of fine zinc powder was charged into a ¾-inch "Wayne" bench top extruder, an extruder manufactured by Wayne Machinery and Die Co. of Garfield, N.J. At the exit of the extruder barrel was located a die having a slit shaped to provide a web one-inch in width and 6 mils in thickness and modified so as to have its internal cross-section gradually decrease from its entrance to its exit.

The extruder was heated at three zones, with the rear portion of the barrel (entrance) being maintained at 215° C. while the front portion of the barrel and die were heated to 282° C. To obtain maximum back pressure immediately upstream from the die slit, the extruder screw was operated at full speed.

The molten nylon resin foamed as it issued from the extrusion die slit and into the ambient room atmosphere and was quenched as a web on a rotating chill roller. This quenched molten nylon resin had a uniform distribution of small cells indicating that the azodicarbonamide, together with the zinc powder, provided for good nucleation of the gases generated within the molten resin.

A longitudinal stretch of 100% of the foamed nylon web was achieved by passing the same over a series of differential speed rolls, after which the web was stretched 150% in a transverse direction by means of a conventional tenter frame.

While still under tension, the foamed and now oriented nylon web was immersed for about one second in a solution of 5 cc. of 37% hydrochloric acid in 100 cc. of acetone and containing 1.76% hydrogen chloride. This solution was at about room temperature and was found to be very active by rapidly removing the cell membranes and leaving a reticulated structure formed of interconnected strands. The reticulated nylon structure was washed in cold water and during the washing step it was further stretched about 2%. The finished reticulated nylon web was then dried and found suitable for use as a filtering medium.

The above-described solution was then gradually diluted and exhibited a high reticulating effect on foamed nylon webs until the hydrogen chloride content thereof reached about 0.4%. The reticulation effect diminished with further dilution of the solution and was barely detectable at 0.112% hydrogen chloride content.

For comparison purposes, 50 ml. of 37% hydrochloric acid was added to 200 ml. of water giving a 7-8% solution of hydrogen chloride. With the solution at room temperature, a foamed nylon web, formed and stretched as described above, was immersed therein for five minutes without undergoing any reticulation. Upon increasing the hydrogen chloride content to 12.5%, action was immediate but destructive. A one-second immersion in this solution followed by immediate rinsing in cold water was sufficient to turn the foamed nylon web completely to a dead-white appearance and produced broken and irregular ribs which was further evidence of destruction. Aqueous acid solutions of a concentration between about 7% and 12.5% were ineffective in removing cell membranes of the foamed nylon but did cause whitening and thus destruction of the junctures of the ribs of the foamed web.

EXAMPLE II

Oriented foamed nylon webs, formed as described in Example I, were immersed in separate solutions containing 5.0%, by weight, sulfuric acid in isopropyl alcohol; 4.36%, by weight, sulfuric acid in tetrahydrofuran; and 5.0%, by weight, sulfuric acid in acetone. All of these solutions provided for very good reticulation of the foamed nylon webs.

Additional samples of foamed nylon webs were treated with solutions containing up to 16.0% sulfuric acid in water. No reticulation effect was apparent even upon heating the solution to 50° C.

EXAMPLE III

An oriented foamed nylon web, formed as described in Example I, was immersed in a solution containing 1.0%, by weight, of dichloroacetic acid (pk of 1.48) in benzene. Reticulation of the foamed nylon web was very rapid. Diluting of the solution to a concentration of about 0.50%, by weight, of dichloroacetic acid provided for a slower rate of reticulation of the foamed nylon web. Further dilution of the solution to about 0.25%, by weight, of dichloroacetic acid provided for no apparent reticulation of the foamed nylon web. On the other hand, solutions of more than 5.0%, by weight, of dichloroacetic acid in benzene required an extremely short immersion period of the foamed nylon web to achieve the desired reticulation thereof and thus was difficult to control. Heating of the solutions, and particularly those containing from about 0.25% to 0.50% by weight, of dichloroacetic acid, provided no significant increase in their reticulating activity.

It is seen that changes and variations may be made without departing from the spirit and scope of the invention as defined in the appended claims.

We claim:
1. A method of making a reticulated structure formed of a network of interconnected strands of nylon resin which includes the steps of subjecting a foamed generally closed-cell cellular material formed of nylon resin to a reticulating solution of a strong acid and a non-aqueous solvent for such strong acid to remove membranous portions of the foam cells whereby a skeletal network of interconnected strands of nylon remains, said acid having a pk value of less than 3.0 in aqueous solutions at about 25° C., said solution having a reticulating effect upon the foam cells equivalent to the reticulating effect provided by a solution containing from about 0.2% to about 5.0% hydrogen chloride in acetone, removing the solution from the skeletal network and drying the network.

2. A method as defined in claim 1 wherein said reticulating solution has a reticulating effect upon the foam cells equivalent to the reticulating effect provided by a solution containing from about 0.4% to about 2.0% hydrogen chloride in acetone.

3. A method as defined in claim 1 wherein said reticulating solution has a reticulating effect upon the foam cells equivalent to the reticulating effect provided by a solution containing from about 1.0% to about 12.0% sulfuric acid in isopropyl alcohol.

4. A method as defined in claim 1 wherein said reticulating solution has a reticulating effect upon the foam cells equivalent to the reticulating effect provided by a solution containing from about 2.0% to about 8.0% sulfuric acid in isopropyl alcohol.

5. A method as defined in claim 1 further including the step of stretching the foamed cellular material of nylon resin in a direction extending at least along one of its longitudinal and transverse axes prior to being subjected to said solution.

6. A method as defined in claim 5 further including the step of maintaining the foamed cellular material in its stretched condition while being subjected to said reticulating solution.

7. A method as defined in claim 6 further including the step of stretching the skeletal network after the reticulating solution is removed therefrom in directions along which it had been originally stretched to remove residual elongation therefrom.

References Cited

UNITED STATES PATENTS

| | | | |
|---|---|---|---|
| 2,884,385 | 4/1959 | Sauer | 260—2.5N |
| 3,171,820 | 3/1965 | Volz | 264—321 |
| 3,300,558 | 1/1967 | Grant et al. | 264—321 |
| 3,403,203 | 9/1968 | Schirmer | 264—321 |

JOHN C. BLEUTGE, Primary Examiner

U.S. Cl. X.R.

260—30.4, 30.6, 30.8, 31.2, 32.8, 33.2, 33.4, 33.6; 264—321, 340

UNITED STATES PATENT OFFICE
CERTIFICATE OF CORRECTION

Patent No. 3,577,359                    Dated May 4, 1971

Inventor(s)   Carevic, Frank E. and Fairbanks, Theodore H.

It is certified that error appears in the above-identified patent and that said Letters Patent are hereby corrected as shown below:

Col. 1, line 44, "Green" should read --Geen--; line 63, "Unitted" should read --United--. Col. 3, line 35, "Mor" should read --More--. Col. 5, line 11, "Inc.," should read --Ind.,--. Col. 6, line 34, "Inc.," should read --Ind.,--.

Signed and sealed this 24th day of August 1971.

(SEAL)
Attest:

EDWARD M. FLETCHER, JR.                 WILLIAM E. SCHUYLER, JR.
Attesting Officer                       Commissioner of Patents